No. 698,628. Patented Apr. 29, 1902.
E. R. BULLARD.
CAMERA.
(Application filed July 15, 1901.)
(No Model.) 2 Sheets—Sheet 1.
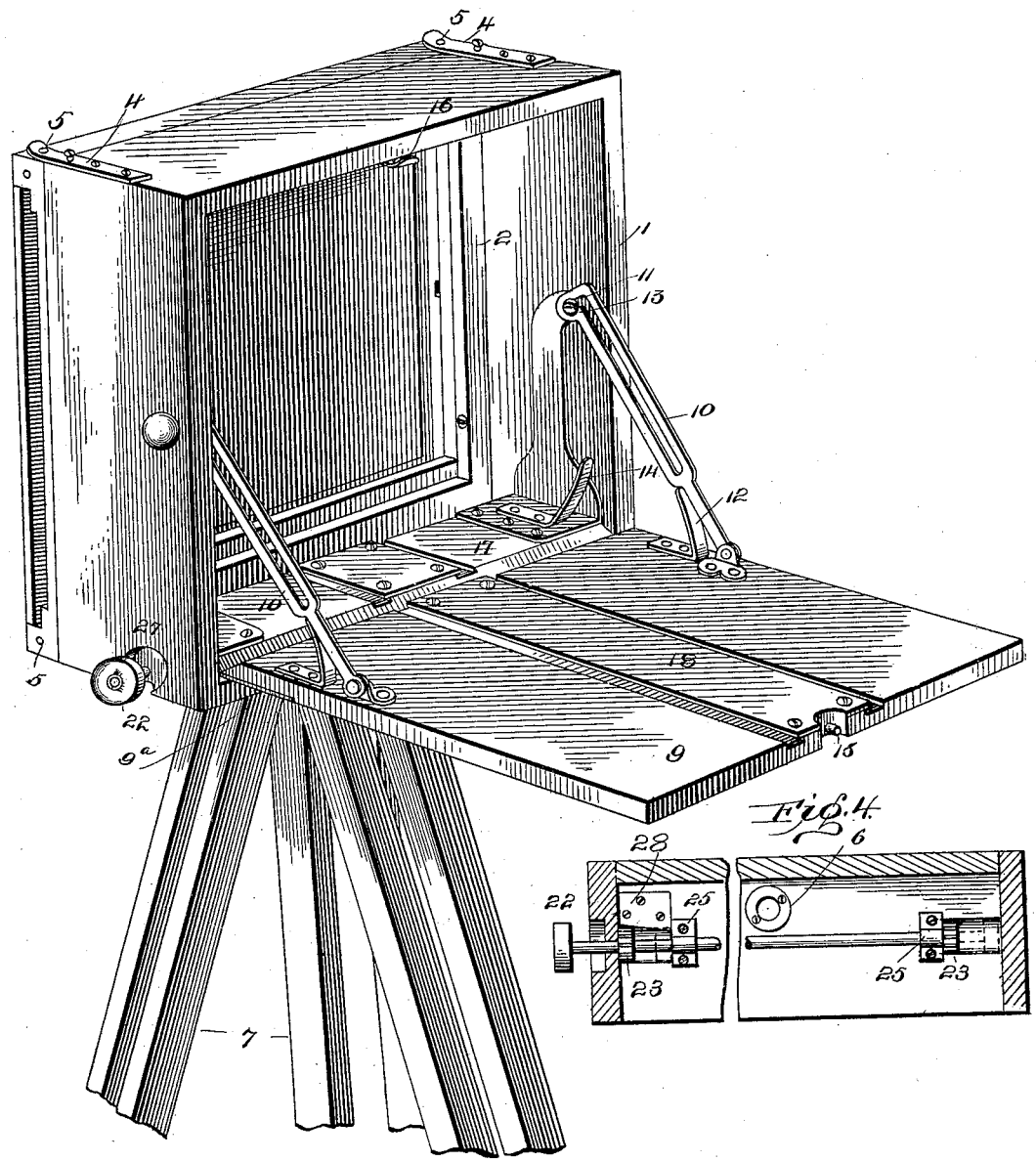

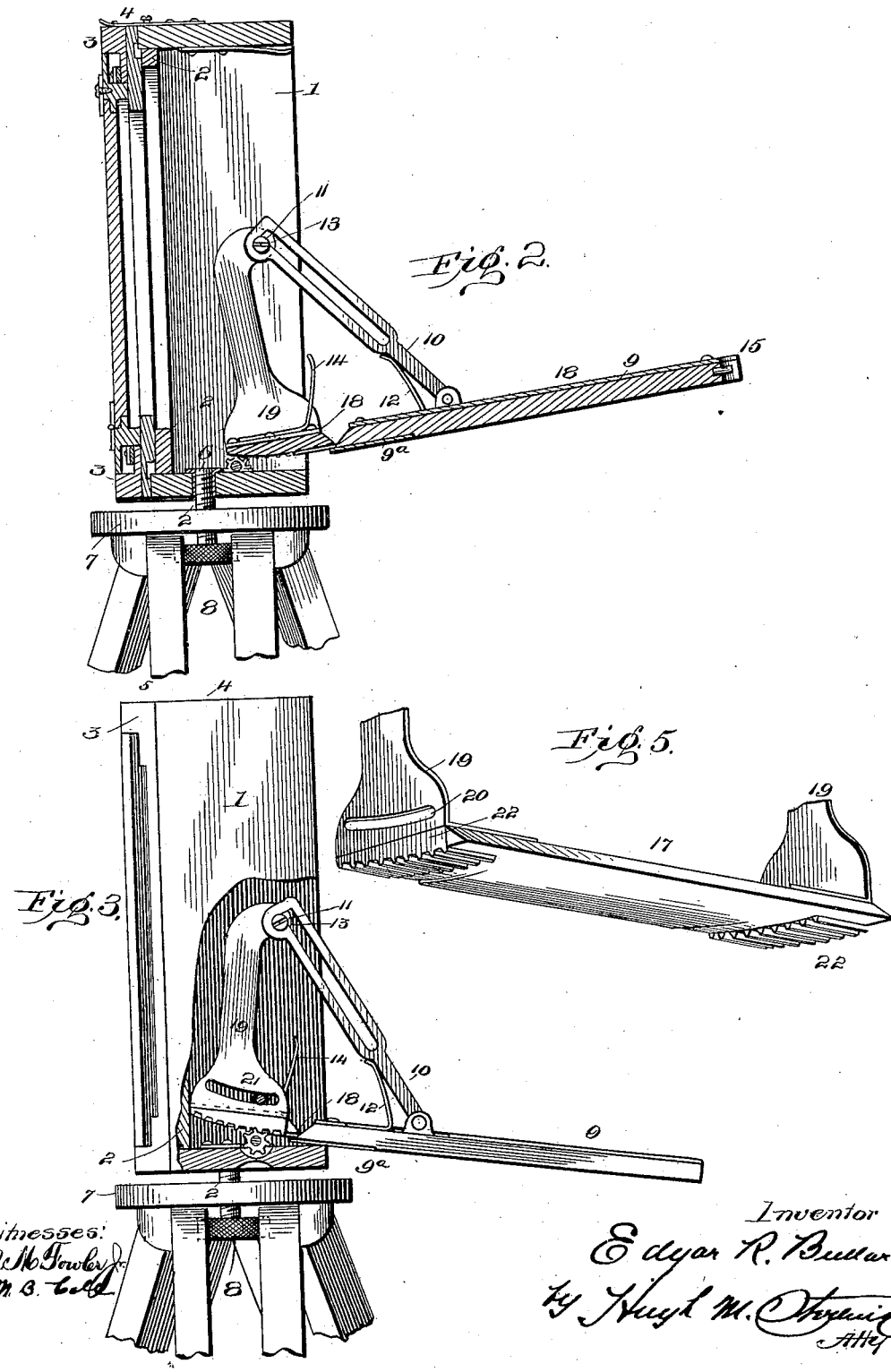

ated April 29, 1902.

UNITED STATES PATENT OFFICE.

EDGAR R. BULLARD, OF SPRINGFIELD, MASSACHUSETTS.

CAMERA.

SPECIFICATION forming part of Letters Patent No. 698,628, dated April 29, 1902.

Application filed July 15, 1901. Serial No. 68,415. (No model.)

*To all whom it may concern:*

Be it known that I, EDGAR R. BULLARD, a citizen of the United States, residing at Springfield, in the county of Hampden, State of Massachusetts, have invented certain new and useful Improvements in Cameras, of which the following is an exact, full, and clear description.

This invention relates particularly to that class of cameras in which the bellows is collapsible and when collapsed adapted to be inclosed within a comparatively small casing, which is provided with a suitable back for holding the sensitive plate and with a falling front forming a bed for the projection of the lens and bellows.

Heretofore in order to provide for the photographing at different elevations cameras have been provided with what is commonly termed a "swing-back," and in some instances the entire casing constitutes a swing-back.

It is therefore the object of this invention to provide for the necessary adjustment of the camera to various inclinations by a bed capable of changing its angle relative to the camera-casing while the said casing remains stationary. By this arrangement the camera-casing, with its sensitive plate, may be set in a perfectly vertical position, while the bed, which is preferably swung from the optical center, may be moved up or down without changing the position of the casing or the tripod, and the resulting picture must necessarily be rectilinear, as a rectilinear image is only possible when the sensitive surface is perfectly parallel with the object to be photographed. Not only is the present invention designed to dispense with the swing-back, but to obviate the necessity for the continued adjustment of the tripod, as when the camera-casing forms the swing-back, as it is impossible for the operator to know how much of a swing will be required without first some experimentation through viewing the image on the ground glass.

A further object of the invention is to provide means for readily effecting the movement of the camera-bed and for locking it at any point of its movement.

To these ends, therefore, the invention consists in the novel construction and arrangement of parts, as hereinafter fully described, and pointed out in the appended claims.

In the accompanying drawings, Figure 1 is a perspective view of a camera constructed in accordance with the invention, the bellows and its accompanying lens-fixtures being omitted therefrom, as being parts well known in their structure and operation; Fig. 2, a vertical section view taken centrally through the camera and showing the bed adjusted to an upward inclination; Fig. 3, a side elevation showing the bed extended and moved into a downward inclination, a portion of the casing being broken away to disclose the operating and locking means; Fig. 4, a top view of the bottom of the casing, and Fig. 5 a perspective view of a swinging section of the bed.

Referring to the drawings, the casing 1 consists of a four-sided frame of sufficient depth to contain the bellows, with its movable front and lens, when collapsed and is provided with an internal flange 2, formed in the present instance by a supplemental frame fitted within the casing adjacent its rear opening and to which the rear of the bellows is attached in the usual manner. The rear opening of the casing is closed by a reversible back 3, forming the focusing-screen and plate-holder and is secured to the back of the casing in any suitable manner, as by the spring-latches 4 in engagement with the pins 5 of the back. The bottom of the casing is provided with a screw-threaded socket 6, by which it is attached to the tripod 7 or other suitable stand by means of the thumb-screw 8, as shown in the tripod-head, and by which attachment the said casing is constituted the stationary element of the camera, remaining in the position to which it may be originally set by the initial adjustment of the tripod or stand, it being important, as explained above, that the casing should be so positioned as to bring the surface of the sensitive plate carried by it parallel with the plane of the object to be photographed, while the adjustment of the camera-bed, which is the movable element, is a matter of after-consideration and can be effected without altering the position of the casing or its support.

The camera-bed 9 constitutes a falling front to the casing, having a hinge connection at its lower edge and also connected with the casing by slotted side arms 10, which have a sliding movement on their pivots 11 when the bed is swung on its hinges, as when raised to close the front opening, and which lock the bed in its fallen position, the spring 12 acting to seat the pivots within the notches 13 during the operation of pulling down the bed, this being a construction commonly employed for such purpose. When in its closed position, the bed 9 is forced against the pressure of the spring 14 and engagement effected by the pin 15 with the spring-latch 16, the bed being thereby held against a normal outward pressure, which on releasing the latch 16, as by the upward pressure of the operator's thumb, will spring the bed outward, so as to be readily brought to its fallen position. In order that the bed thus formed of the cover of the casing may have a swinging movement on its links when they are in their extended position, there is provided within the casing and adjacent its bottom side a movable section or connecting member 17, to which the bed is hinged, as at 18, and which is capable of being extended or retracted to swing the bed into various inclinations. Preferably, but not necessarily, this movable connecting member is adapted to swing, and from the pivots 11; but it is obvious that it may be supported within guides in any well-known manner and have merely a sliding movement.

As shown, the connecting movable member 17 comprises a section of the bed, having a guideway or track 18 for the movable front (not shown) and forming a continuation of the way or track on the falling front portion, and swinging side members 19, one of which has formed therein a segmental slot 20, into which extends a pin 21 for limiting the swinging movement. The under side of the bed portion of the member 17 is convexly curved to substantially conform to the arc described by its swinging, so that the space between it and the bottom of the casing will not vary. This space is closed at the front of the casing when the bed 9 is raised to its closed position by the lip 9ᵃ, formed by a metal strip attached to the bed, so as to project slightly beyond the hinged edge thereof. Corresponding to the curve of the under side of the bed portion 17 are curved racks 22, set one within each end thereof. These racks mesh with pinions 23, rigidly mounted on a shaft 24, extending through one side of the casing and slidably held within bearings 25, secured to the top face of the bottom side, which bottom side is also recessed to receive the pinions and permit them and the shaft to move lengthwise. This lengthwise movement permits the rotatable nut 26, provided on the projecting end of the shaft, to be withdrawn from the recess 27, where it is normally kept flushed with the casing and renders its rotation, therefore, easy.

The locking of the swinging bed in any position to which it may be adjusted by the rotation of the shafts and its pinions is accomplished by a plate 28, secured to the bottom of the casing adjacent one of the pinions, having an edge arranged aslant the path of the pinion's thrust, so that on pushing the pinion inwardly, as when the rotatable nut 26 is forced inward, the edge of the said plate will enter between the teeth of the pinion and lock it against movement, the oblique arrangement of the edge giving a wedging action, and thus insuring positive and binding engagement, while when the nut is withdrawn to its extended position a releasing of the locking-plate is thereby effected.

What I claim is—

1. In a camera, the combination with the camera-casing adapted for attachment to a suitable stand, of a bed for the camera-front pivotally supported from the casing, and a movable member within said casing to which the bed is hinged, whereby as said member is extended or retracted the bed will receive a corresponding movement and at the same time change its inclination substantially as and for the purpose set forth.

2. In a camera, the combination with the camera-casing adapted for attachment to a suitable stand, of a swinging bed for the camera-front, and a swinging support within said casing, having a hinge connection with the rear of said bed, substantially as and for the purpose set forth.

3. In a camera, the combination with a camera-casing adapted for attachment to a suitable stand, of a bed for the camera-front, swinging supports to which said bed is pivotally connected, and a swinging support within the casing, having a hinge connection with the said bed, substantially as and for the purpose set forth.

4. In a camera, the combination with the camera-casing adapted for attachment to a suitable stand, of a swinging bed for the camera-front, having a pivotal connection with its swinging supports, a movable supporting member within the casing, to which the bed is hinged, and means for extending and retracting said movable member to swing and tilt the bed, substantially as and for the purpose set forth.

5. In a camera, the combination with the camera-casing adapted for attachment to a suitable stand, of a swinging bed for the camera-front, having a pivotal connection with its swinging supports, a movable supporting member within the casing, to which the bed is hinged, means for extending and retracting said member to swing and tilt the bed, and means for locking said member at any point of its movement, substantially as and for the purpose set forth.

6. In a camera, the combination with the camera-casing adapted for attachment to a suitable stand, of a swinging bed for the camera-front, having a pivotal connection with its swinging supports, a movable supporting member within the casing, to which the bed is hinged, the same carrying one or more racks, and a rotatable shaft having one or more pinions for engaging said rack or racks, whereby to extend or retract said member to swing and tilt the bed, substantially as and for the purpose set forth.

7. In a camera, the combination with a camera-casing adapted for attachment to a suitable stand, of a swinging bed for the camera-front, having a pivotal connection with its swinging supports, a movable supporting member within the casing, to which the bed is hinged, the same carrying one or more racks, a rotatable shaft mounted to slide longitudinally, and having one or more pinions for engagement with said rack or racks whereby to extend or retract said member to swing and tilt the bed, and a locking-plate secured to the casing having an edge arranged to enter between the teeth of one of said pinions when the shaft is slid in one direction, substantially as and for the purpose set forth.

8. In a camera, the combination with a camera-casing, adapted for attachment to a suitable stand, of a swinging bed for the camera-front, having a pivotal connection with its swing-supports, a movable supporting member within the casing, to which the bed is hinged, the same comprising a cross-piece in proximity to the bottom of the casing and carried by swinging supports, and having a convex under surface on which is provided one or more racks, and a rotatable shaft having one or more pinions for engagement with said rack or racks, whereby to extend or retract the said member to swing and tilt the bed, substantially as and for the purpose set forth.

9. In a camera, the combination with a camera-casing, adapted for attachment to a suitable stand, a falling front having a link connection with the casing, a movable member within said casing to which said front is hinged, and an extension carried by said front and adapted to close the space intermediate the hinge connection and the bottom of the casing, when covering the front opening thereof, substantially as set forth.

In testimony whereof I affix my signature in presence of two witnesses.

EDGAR R. BULLARD.

Witnesses:
E. S. HITCHCOCK,
JOHN W. ROBB.